United States Patent
Brandsma et al.

(10) Patent No.: US 6,468,174 B1
(45) Date of Patent: Oct. 22, 2002

(54) DRIVE BELT AND TRANSMISSION WHEREIN SUCH IS USED

(75) Inventors: Arjen Brandsma, Tilburg; Johannes Hendrikus Van Lith, Berlicum, both of (NL)

(73) Assignee: Van Doorne's Transmissie B.V., Tilburg (NL)

( * ) Notice: Subject to any disclaimer, the term of this patent is extended or adjusted under 35 U.S.C. 154(b) by 6 days.

(21) Appl. No.: 09/627,333

(22) Filed: Jul. 27, 2000

(30) Foreign Application Priority Data

Jul. 27, 1999 (EP) .............................. 99202470

(51) Int. Cl.[7] .............................. F16G 5/00
(52) U.S. Cl. .............................. 474/242
(58) Field of Search .............................. 474/201, 202, 474/237, 240, 242, 245

(56) References Cited

U.S. PATENT DOCUMENTS

| | | | | |
|---|---|---|---|---|
| 5,004,450 A | * | 4/1991 | Ide | 474/242 |
| 5,123,880 A | * | 6/1992 | Sekine et al. | 474/244 |
| 5,152,722 A | * | 10/1992 | Yamada | 474/240 |
| 5,154,675 A | * | 10/1992 | Roovers | 474/242 |
| 5,180,345 A | * | 1/1993 | Van der Zande | 474/201 |
| 5,427,579 A | * | 6/1995 | Kanehara et al. | 474/28 |
| 5,533,940 A | * | 7/1996 | Smeets | 474/242 |
| 6,074,317 A | * | 6/2000 | Kobayashi | 474/201 |
| 6,086,499 A | * | 7/2000 | Brandsma | 474/201 |
| 6,123,637 A | * | 9/2000 | Yagasaki | 474/242 |
| 6,217,472 B1 | * | 4/2001 | Fujioka et al. | 474/242 |

FOREIGN PATENT DOCUMENTS

| | | |
|---|---|---|
| EP | 0 522 612 | 1/1993 |
| EP | 0 798 492 | 10/1997 |

OTHER PUBLICATIONS

S. Ashley, "Is CVT The Car Transmission of the Future?", Nov. 1994, *Mechanical Engineering*, XP002124902 New York, US, pp. 64–68.

* cited by examiner

Primary Examiner—David A. Bucci
Assistant Examiner—Vicky A. Johnson
(74) Attorney, Agent, or Firm—Young & Thompson

(57) ABSTRACT

Drive belt for a continuously variable transmission, in particular for motor vehicles, includes at least one continuous band slidably supported by a number of cross elements each having two principle faces oriented substantially transverse to the longitudinal direction of the drive belt, the cross elements having a width B and a specific weight ρ. The parameters of the width B and the specific weight ρ satisfy the expression $$B^2 \cdot \rho \leq 10.$$

8 Claims, 4 Drawing Sheets

DRIVE BELT AND TRANSMISSION WHEREIN SUCH IS USED

BACKGROUND OF THE INVENTION

The invention is related to a transmission drive belt. Such a drive belt is generally known, for example from EP-A-0.522.612, and is particularly suited for application in a continuously variable transmission or CVT for motor vehicles. The invention further relates to a motor vehicle provided with a continuously variable transmission comprising a drive belt according to the invention.

DESCRIPTION OF THE RELATED ART

The known drive belt is suited for application in a CVT of the type provided with a primary variable pulley provided on a primary shaft and a secondary variable pulley provided on a secondary shaft. The drive belt is wound around said pulleys for transmitting torque between them. Each of the variable pulleys comprises two conical discs at least one of which is axially movable with respect to the other for, on the one hand, varying a running radius of the drive belt between the discs of a pulley and for, on the other hand, applying a pinching force to the drive belt. The amount of pinching force applied to the drive belt determines the amount of torque that can be transmitted between said shafts without slippage between drive belt and pulley occurring. The maximum amount of pinching force that may be applied is determined by the torque transmitting capacity of the drive belt, i.e. the maximum amount of torque the drive belt is allowed to be loaded with. If the torque transmitting capacity of the drive belt is exceeded, the life span of the drive belt may decrease significantly and the drive belt may fail prematurely.

The known drive belt comprises at least one continuous, i.e. circular, band slidably supported by a number of cross elements. The cross elements have a front and a back principal face separated by side faces over the thickness of the cross elements. A section of each principal face is of trapezoidal shape, the widest side of the trapezoid also being the width of the cross elements. Two sides of said section are slanted and are mutually oriented at an angle, the so called belt angle. The side faces of the cross element adjoining said section are suited and designed for co-operation with the conical pulley discs. The cross elements are usually also provided with at least one pillar part, which be connected to head part of the cross element, for forming an at least partly enclosed space accommodating the continuous band.

During operation of the drive belt, the pulley discs apply the pinching force to the side faces of the cross elements at the location of the trapezoidal section. In combination with the conical shape of the pulley discs, the pinching forces applied by the primary pulley and the secondary pulley urge the cross elements radially outward, thereby tensioning the continuous band. The torque transmitting capacity of the drive belt is related to the maximum allowable stress level in the continuous band and is thus proportional to the surface area of a cross section of the continuous band transverse to the longitudinal direction of the drive belt.

An known measure for increasing the torque transmitting capacity of the drive belt is thus to increase said surface area by increasing the radial thickness of the continuous band. However, to maintain the required flexibility and resistance to fatiguing of the drive belt, the radial thickness of the continuous band is limited. Therefore, the drive belt is usually provided with a number of continuous bands, which are radially stacked one around the other forming a laminated ring. Often two said laminated rings are adopted in a single drive belt mutually axially spaced.

Another known measure for increasing the torque transmitting capacity of a drive belt is to adopt a small contact angle between the drive belt and the pulley discs, as is described in the European patent application EP-A-0.798.492. Under the influence of a given pinching force the cross elements are urged radially outward with a force which is essentially proportionally dependent on the contact angle. Thus, when said contact angle is reduced, the continuous band is tensioned less at a given pinching force. In effect this means, that the allowable pinching force and thus the torque transmitting capacity of the drive belt may be increased by reducing said contact angle. For the drive belt this means that the belt angle, at which the two slanted sides of the trapezoidal section are mutually oriented, is to be made smaller.

Yet another known measure for increasing the torque transmitting capacity of a drive belt is to increase the axial width of the continuous band or bands. In doing so, the axial dimension, i.e. the width, of the cross elements is to be increased accordingly in order to sufficiently support the continuous band or bands. The article "Is CVT the car transmission of the future" published November 1994 in the journal of Mechanical Engineering discusses drive belts with 24, 30 and 40 millimetre wide steel cross elements. Such drive belts have been manufactured with two laminated rings each formed by 9, 10 or 12 continuous bands made of maraging steel. From this article it appears that by increasing the width of the cross elements or by increasing the number of continuous bands the torque transmitting capacity of the drive belt may be increased.

In practice, however, it appears that such wider belts do not automatically result in an increased power transmitting capacity of the drive belt. Moreover, changing the contact angle goes with immense technical consequences as well as high costs throughout the chain of automotive industry, since it goes with changes in the design of pulleys, transmission control system, hydraulic pump, etc., and is consequently not desired in each case. Changing the number of continuous bands is often not preferred for logistic, manufacturing as well as cost reasons. The problem underlying. the invention encompasses the question of how to influence drive belt torque transmitting capacity within the aforementioned constraints.

SUMMARY OF THE INVENTION

The invention is thus concerned with providing a tool for drive belt within the aforementioned constraints. The invention also takes into account the material of which the cross elements are made. According to the invention the width of the cross elements and thus of the continuous band or bands may be determined depending on the specific mass of the cross elements by applying the below equation 1. Furthermore, said equation provides a simple means to determine the design of a drive belt with essentially maximum torque transmitting capacity within the constraints of a given contact angle and a given number of continuous bands. The invention makes use of the insight that during use of the drive belt the stress in the continuous band or bands depends not only on the surface area of a cross section of the continuous band or bands transverse to the longitudinal direction of the drive, but also to a significant extent on the weight of a cross element. The torque transmitting capacity of a drive belt is limited and can not be increased significantly beyond a certain value by further increasing the width of a continuous band and of the supporting cross elements. According to the invention it was surprisingly found that the torque transmitting capacity of a drive belt might actually decrease beyond a certain width of the cross elements. The technical insight is, that during operation of a continuously variable transmission equipped with a drive belt, situations occur wherein the centrifugal force acting on the drive belt is of the same order of magnitude as the forces in the drive belt due to the toque transmitted by the belt. According to the invention this results in an upper limit to the useful width of the cross elements and thus of the continuous band or bands.

This insight may be understood as follows. The torque transmitting capacity of the drive belt is substantially proportional to the width of its continuous band or bands. When said width is increased, the width, i.e. the axial dimension, of the supporting cross elements have to be increased accordingly to be able to support the continuous bands. Since the cross elements are subjected to the compressive pinching force in between the pulley discs, the height and the thickness of the cross elements is to be increased accordingly to maintain the strength of the cross elements and in particular their resistance against buckling. An increase in the thickness of the cross elements does not increase the overall mass of the drive belt, since this just means that less cross elements are needed to make up the drive belt. However, the mass of the drive belt, and therefore the centrifugal force acting on said drive belt, is still substantially proportional to the width and the height of the cross elements. From the above it may be concluded that the torque transmitting capacity of the drive belt increases substantially proportionally to the width of its continuous band or bands, and thus to the width of the cross elements, but also decreases substantially proportionally to the width and the height of the cross elements, due to the centrifugal force. As mentioned earlier, the height is assumed to increase with increasing width, so the torque transmitting capacity may be assumed to decrease substantially proportionally to the squared width of the cross elements.

It was found that, the equation for determining the width of the cross elements of the drive belt, i.e. the sum of the proportionality's, may be approximated by:

$$B^2 \cdot \rho \leq 10 [kg/m] \quad \text{(Equation 1)}$$

wherein B is the width of the cross elements, $\rho$ is the specific mass of the cross elements. Actually, the boundary value is dependent on the specific automotive application of the drive belt, however, a value of about 10 kg/m was found to be a generally applicable value for automotive applications. For a drive belt with steel cross elements this means that the width B of the cross elements should be about 36 mm or less. It may thus be concluded, that whereas the known drive belts with 24 mm and 30 mm wide cross elements satisfy the equation, the drive belt with 40 mm wide cross elements will not perform as may be expected beforehand.

The invention furthermore provides for a drive belt with essentially maximum torque transmitting capacity. According to the invention such a drive belt is characterised by cross elements having a width B that satisfies the following relation:

$$B^2 \cdot \rho = 9.0 \pm 1.0 [kg/m] \quad \text{(Equation 2)}$$

According to the invention the number of continuous bands forming a laminated ring is also bound. Said number of continuous bands may be 15 at most. It was found that the increase in torque transmitting capacity associated with adding a $16^{th}$ continuous band does not overcome the accompanying drawbacks, such as the additional assembly costs, weight and frictional losses during operation.

According to the invention it is furthermore preferred to adopt cross elements wherein the two slanted sides of the trapezoidal section are oriented at a belt angle of more than 0.14 radians but less than 0.38 radians and which is preferably equal to essentially 0.26 radians. When said belt angle is smaller than 0.14 radians it becomes almost impossible to change the running radius of the drive belt and thereby the transmission ratio of the CVT, whereas when said belt angle is larger than 0.38 radians the tension if the continuous bands due to the pinching force becomes inefficiently large. A value of approximately 0.26 radians was found to be the optimum between the boundary values.

The invention is further related to a motor vehicle according to equation 4 below. With equation 4, the width B of the cross elements may be calculated for a given automotive application of the drive belt. Equation 4 may be more applicable in comparison to equation 1, for applications having a more or less extreme maximum engine speed, engine torque or belt running radius. As was explained in the above, the width B of the cross elements is dependent on the centrifugal force acting on the drive belt, because the belt load is partly determined by said centrifugal force. The centrifugal force is usually largest when the motor vehicle in which the drive belt is applied is moving at maximum vehicle speed. In more general terms, the highest centrifugal force acts on the drive belt when the quotient of the drive belt running radius and the squared longitudinal speed of the drive belt is smallest, as may be concluded from the well known equation defining the centrifugal force $F_c$ acting on an object:

$$F_c = \frac{m \cdot v^2}{r} \quad \text{(Equation 3)}$$

wherein in m is the mass, v is the speed and r is the radius of the trajectory of the object. As is discussed earlier, the stress in the drive belt is also determined by the engine torque to be transmitted by the drive belt. Furthermore, the bending stress occurring when the drive belt runs between the discs of the pulleys in a curved trajectory also contributes to the overall stress in the drive belt. Using these insights in combination with the equation for determining centrifugal force, it is found according to the invention that the equation for determining the dependency of the width B of a cross element is given by:

$$B^2 \cdot \frac{\rho}{(r \cdot v^{-2})} \leq 2000 \cdot T_{MAX} - \frac{1600}{r_{MIN}} \quad \text{(Equation 4)}$$

The invention will now be illustrated further with reference to the accompanying figures.

DESCRIPTION OF THE PREFERRED EMBODIMENTS

Figure 1:
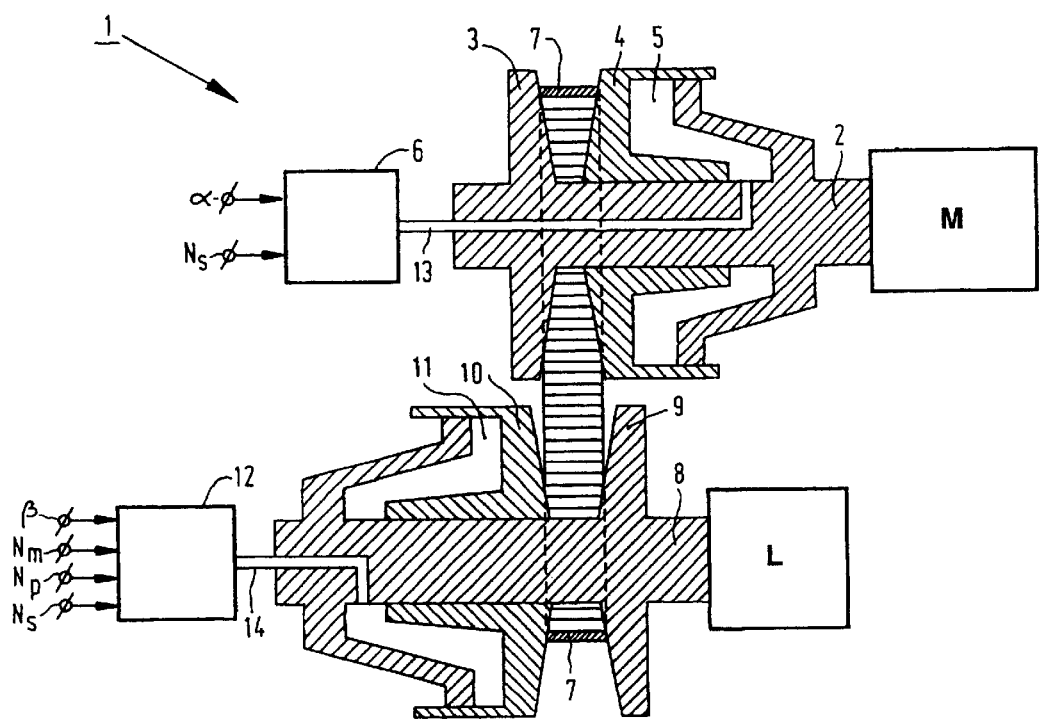
FIG. 1 shows a schematic representation of a continuously variable transmission with a drive belt and pulleys.

In FIG. 1 a schematic representation is given of a continuously variable transmission 1 located between an engine M and a load L for varying a speed ratio and a torque ratio between the engine M and the load L. The transmission comprises a primary shaft 2 driven by the engine M and a secondary shaft 8 driving the load L. A primary pulley 2, 3 and 4 comprising a fixed disc 3 and an axially movable disc 4 is provided on the primary shaft 2. A secondary pulley 8, 9 and 10 comprising a fixed disc 9 and an axially movable disc 10 is provided on the secondary shaft 8. The movable disc 4 of the primary pulley 2, 3 and 4 is operated by movement means 5, 6 and 13 which determine the pressure in chamber 5 in dependence on a number of parameters, such for example as accelerator paddle depression $\alpha$ and rotational speed Ns of the secondary shaft 8. The movable disc 10 of the secondary pulley 8, 9 and 10 is operated by movement means 11, 12 and 14 which determine the pressure in chamber 11 in dependence on a number of parameters, such as for example throttle opening $\beta$, rotational speed Nm of the engine M, rotational speed Np of the primary shaft 2 and Ns. A drive belt 7 is provided around said pulleys 2, 3, 4, 8, 9 and 10 for transmitting torque from the primary shaft 2 to the secondary shaft 8. The ratio of the pressures in chambers 5 and 11 determines the transmission ratio, whereas the level of said pressures determines the maximum amount of torque that can be transmitted by the drive belt 7 between the engine M and the load L.

Figure 2:
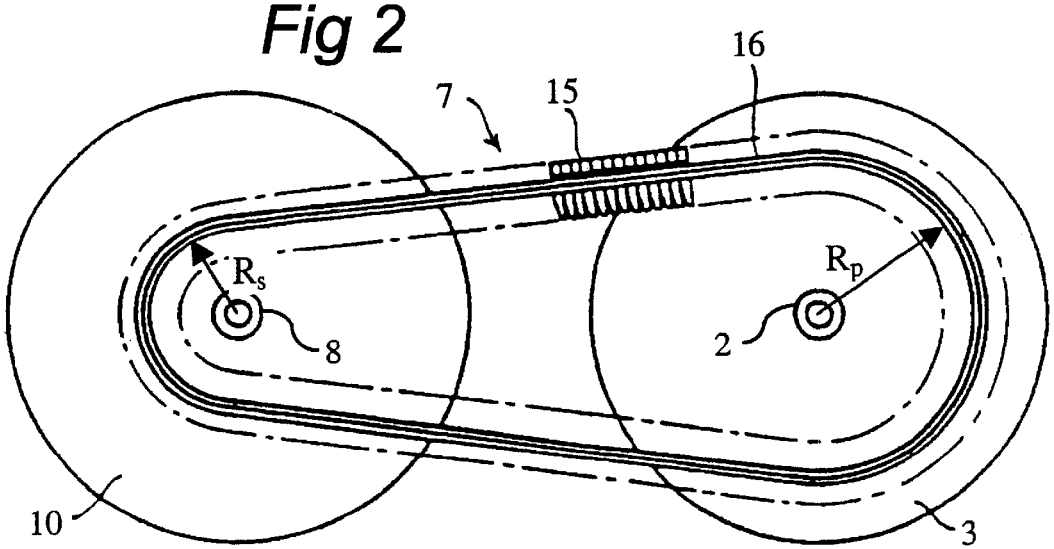
FIG. 2 shows a simplified cross section view of a continuously variable transmission.

In FIG. 2 a simplified cross sectional view of the continuously variable transmission 1 is shown. The drive belt 7 is provided with a laminated ring 16 formed by a number of continuous bands and with cross elements 15, a number of which are shown. The arrow marked Rs denotes the running radius of the drive belt 7 in the secondary pulley 8, 9 and 10 and the arrow marked Rp denotes the running radius in the primary pulley 2, 3 and 4. The ratio between the lengths of said arrows Rs and Rp is a measure of the transmission ratio of the continuously variable transmission 1.

Figure 3:
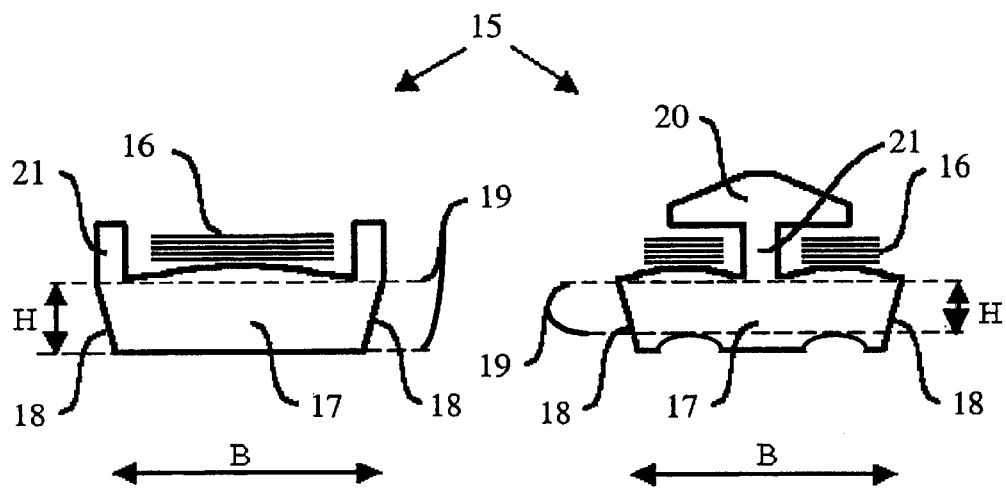
FIG. 3 shows two types of cross element.

In FIG. 3 two types of cross elements 15 are shown. The front principal faces 17 of the cross elements 15 have a section of trapezoidal shape, the upper and lower sides of which are denoted by the dotted lines 19. The section has a width B and a height H. The two slanted sides 18 of the trapezoid are oriented at the belt angle. Side faces (not shown) of a cross element adjoining the front principal face 17 and a back principle face (not shown) are designed and suited for co-operation with the pulley discs 3, 4, 9 and 10, at least at a location adjoining the trapezoidal section. Laminated rings 16 are also shown. The cross elements 15 are further provided with head part 20 and/or pillar part(s) 21 for containment of the laminated rings 16.

Figure 4:
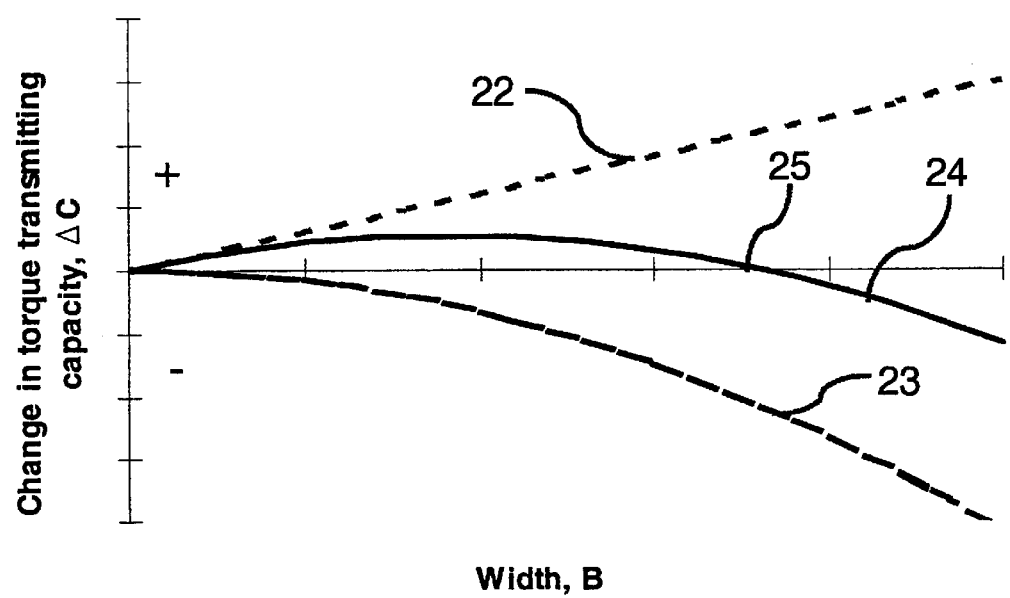
FIG. 4 is a graph of the dependency of the drive belt torque transmitting capacity on the width of the cross elements.

In FIG. 4 a graph is provided showing the change in the torque transmitting capacity $\Delta C$ of a drive belt 7 in dependency on the width B of the cross elements 15 for a given drive belt design, assuming that the continuous bands are as wide as possible given the width B of the cross elements 15. The dotted line 22 shows the positive linear dependency of $\Delta C$ on the width B of the cross elements 15, i.e. on the width of the continuous band or bands. The dashed line 23 shows the negative and quadratic dependency according to the invention of $\Delta C$ on the width B of the cross elements 15. Finally, the solid curve 24 shows the sum of said dotted curve 22 and dashed curve 23. The latter curve shows that up to a width B denoted by reference numeral 25 the torque transmitting capacity increases, since up to said width B the change in torque transmitting capacity $\Delta C$ is positive, whereas above said width B the torque transmitting capacity decreases.

Figure 5:
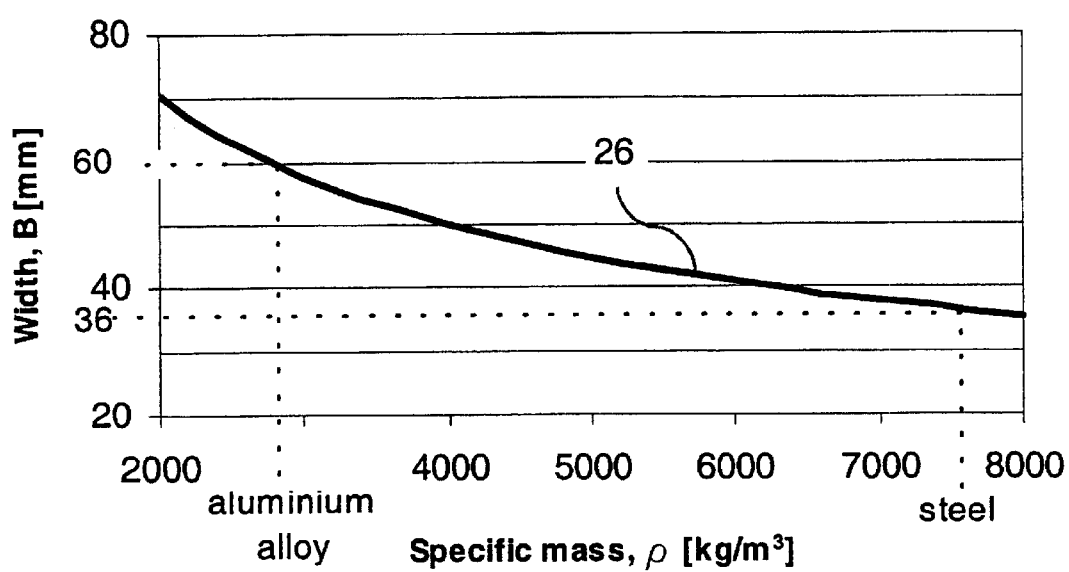
FIG. 5 is a graphical representation of the equation according to claim 1.
Figure 6:
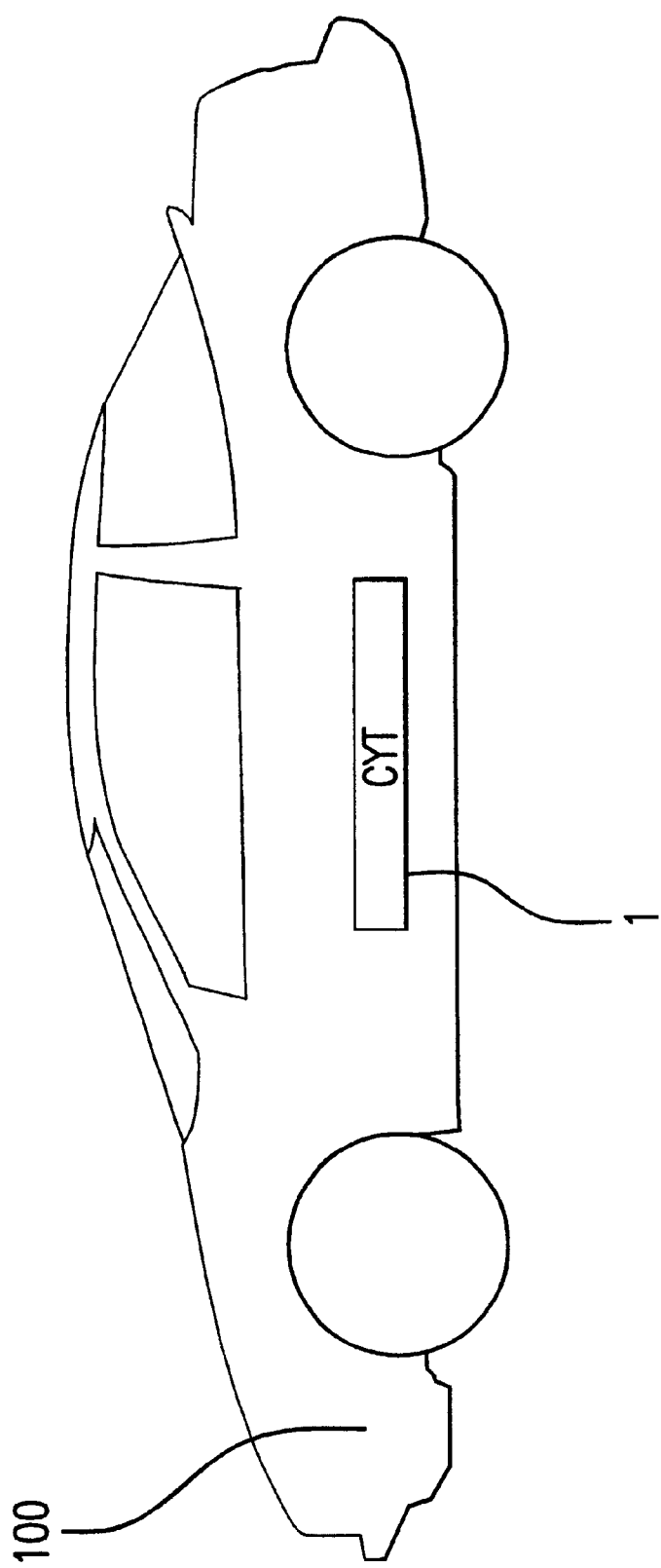
FIG. 6 is a graphical representation of a motor vehicle with a CVT.

FIG. 5 a graph is provided, wherein curve 26 shows the dependency of the maximum applicable value of the width B of the cross elements 15 in dependency on the specific mass $\rho$ of the material of which the cross element 15 are made. Said maximum applicable value of B being defined as the width B up to which the torque transmitting capacity of the drive belt 7 increases. The graph represents equation 1. The boundary value of 10 kg/m has been established empirically and was found to be generally applicable, especially for relatively high torque drive belt applications. Two examples are given in FIG. 5. For steel cross elements 15 a width B of up to approximately 36 mm is found and for cross elements made of an aluminum alloy a width B of up to approximately 60 millimeters is found.

It is remarked that, for reasons of ease and cost of manufacturing as well as the noise level generate during operation of the drive belt, the thickness T and the height H of a load carrying cross section of the cross element 15 are in practice preferably 2 mm and 8 mm at most respectively. This means that the width B of a cross element 15 is also bound, since, as was discussed earlier, it is necessary to increase the width B, the height H and the thickness T of the cross elements 15 simultaneously in order to maintain the required strength and resistance against buckling. The maximum width $B_B$ due to the buckling effect will be approximated in the following. In the approximation the influence centrifugal force is neglected, which is allowable since the highest pinching force is applied at low speed, e.g. during driving-off of a motor vehicle, and the risk of buckling is thus most critical at low speeds of the drive belt. As was mentioned earlier, the torque transmitting capacity of the drive belt 7, i.e. the maximum amount of torque to be transmitted by the drive belt $T_{MAX}$, is essentially proportional to the width B of its cross elements 15, according to:

$$T_{MAX} = C1 \cdot B$$

wherein C1 is a constant.

For transferring said maximum amount of torque $T_{MAX}$ between drive belt and pulleys without slip, a minimum pinching force $F_{CL}$ is required:

$$F_{CL} = C2 \cdot T_{MAX}$$

wherein C2 is a constant. And thus:

$$F_{CL} = C3 \cdot B$$

From the specifications of known drive belt applications and designs, a value of approximately $5 \cdot 10^4$ was calculated to be applicable for C3.

With Euler's equation the force $F_B$ at which an object buckles may be calculated:

$$F_B = \pi^2 \cdot \frac{E \cdot I_{MIN}}{L^2}$$

wherein E is the Young's modulus of elasticity, I is the area moment of inertia and L is the length of the object seen in the direction of $F_B$. Here L may be replaced by the width B of the cross element 15.

Combining the latter two equations, an equation may be derived for estimating the maximum width $B_B$:

$$B_B = \sqrt[3]{\pi^2 \cdot \frac{E \cdot H \cdot T^3}{12 \cdot 5 \cdot 10^4}}$$

Using the latter equation for steel cross elements a value of 59 mm is found for $B_B$. This value is much larger than the 36 mm found using the equation according to claim 1 and buckling of the cross element is thus not an issue here. However, for cross elements made of an aluminum alloy, $B_B$ is approximately equal to 42 mm which is considerably smaller than most of the values found using FIG. 5. In this case the width B of the cross elements is thus limited not by the centrifugal force acting on the belt but by the buckling effect. In these situations it remains of course possible to increase the maximum width $B_B$ by making the cross elements thicker and/or higher, or to increase the modulus of elasticity.

What is claimed is:

1. Drive belt (7) for a continuously variable transmission (1) comprising two laminated rings (16) that are mutually axially spaced each of which is formed by a number of radially stacked endless bands and is slidably supported by a number of cross elements (15) each having two principle faces (17) oriented substantially transverse to the longitudinal direction of the drive belt (7), the cross elements (15) having a width B and a specific weight ρ, characterized in that, the parameters of the width B and the specific weight ρ satisfy the equation $$B^2 \cdot \rho = 9.0 \pm 1.0.$$

2. Drive belt (7) according to claim 1, characterised in that, said number is 14 or 15.

3. Drive belt (7) according to claim 1 with the principal faces (17) of the cross elements (15) having a substantially trapezoidal section, characterised in that, two sides (18) of said section are mutually oriented at an belt angle which is more than 0.14 radians, but less than 0.38 radians.

4. Drive belt (7) according to claim 3, characterised in that, said belt angle is approximately equal to 0.26 radians.

5. Motor vehicle with a continuously variable transmission (1) provided with a drive belt (7) comprising at least one continuous band slidably supported by a number of cross elements (15) each having two principle faces (17) oriented substantially transverse to the longitudinal direction of the drive belt (7), the cross elements (15) having a width B and a specific weight ρ, characterised in that, the parameters of the width B and the specific weight ρ satisfy the equation $$B^2 \cdot \frac{\rho}{(r \cdot v^{-2})} \leq 2000 \cdot T_{MAX} - \frac{1600}{r_{MIN}}$$

wherein T is the engine torque, r is the smallest drive belt running radius and v is the drive belt running speed during operation of the motor vehicle at maximum vehicle speed and wherein drive belts (7) with steel cross elements (15) having a width B of 30 mm or less are explicitly disclaimed.

6. Motor vehicle according to claim 5, with the principal faces (17) of the cross elements (15) of the drive belt (7) having a substantially trapezoidal section, characterised in that, two sides (18) of said section are mutually oriented at an belt angle which is approximately equal to 0.26 radians and in that the drive belt (7) comprises two mutually axially spaced laminated rings (16) each formed by 14 radially stacked continuous bands.

7. Continuously variable transmission (1) provided with a drive belt (7) comprising at least one continuous band slidably supported by a number of cross elements (15) each having two principle faces (17) oriented substantially transverse to the longitudinal direction of the drive belt (7), the cross elements (15) having a width B and a specific weight ρ, characterized in that, the parameters of the width B and the specific weight ρ satisfy the equation $$B^2 \cdot \frac{\rho}{(r \cdot v^{-2})} \leq 2000 \cdot T_{MAX} - \frac{1600}{r_{MIN}}$$

wherein T is the engine torque, r is the smallest drive belt running radius and v is the drive belt running speed during operation of the motor vehicle at maximum vehicle speed and wherein drive belts (7) with steel cross elements (15) having a width B of 30 mm or less are explicitly disclaimed.

8. Continuously variable transmission according to claim 7, with the principal faces (17) of the cross elements (15) of the drive belt (7) having a substantially trapezoidal section, characterised in that, two sides (18) of said section are mutually oriented at a belt angle which is approximately equal to 0.26 radians and in that the drive belt (7) comprises two mutually axially spaced laminated rings (16) each formed by 14 radially stacked continuous bands.

* * * * *